Aug. 13, 1940.  T. BARTHOLOMEW  2,210,999
PRODUCTION OF DRY GRANULATED SLAG
Filed Dec. 20, 1937  2 Sheets-Sheet 2
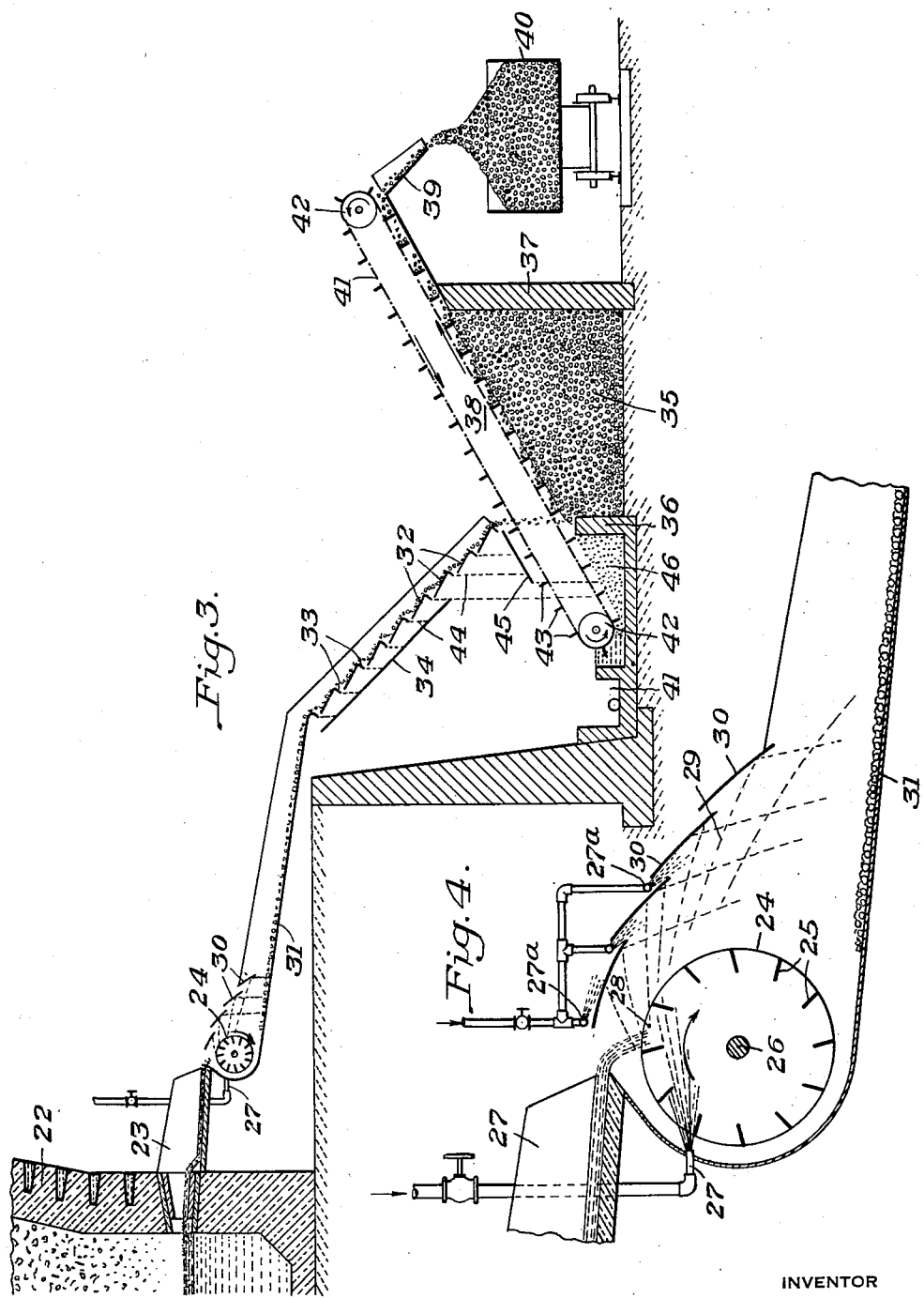
INVENTOR
Tracy Bartholomew Patented Aug. 13, 1940

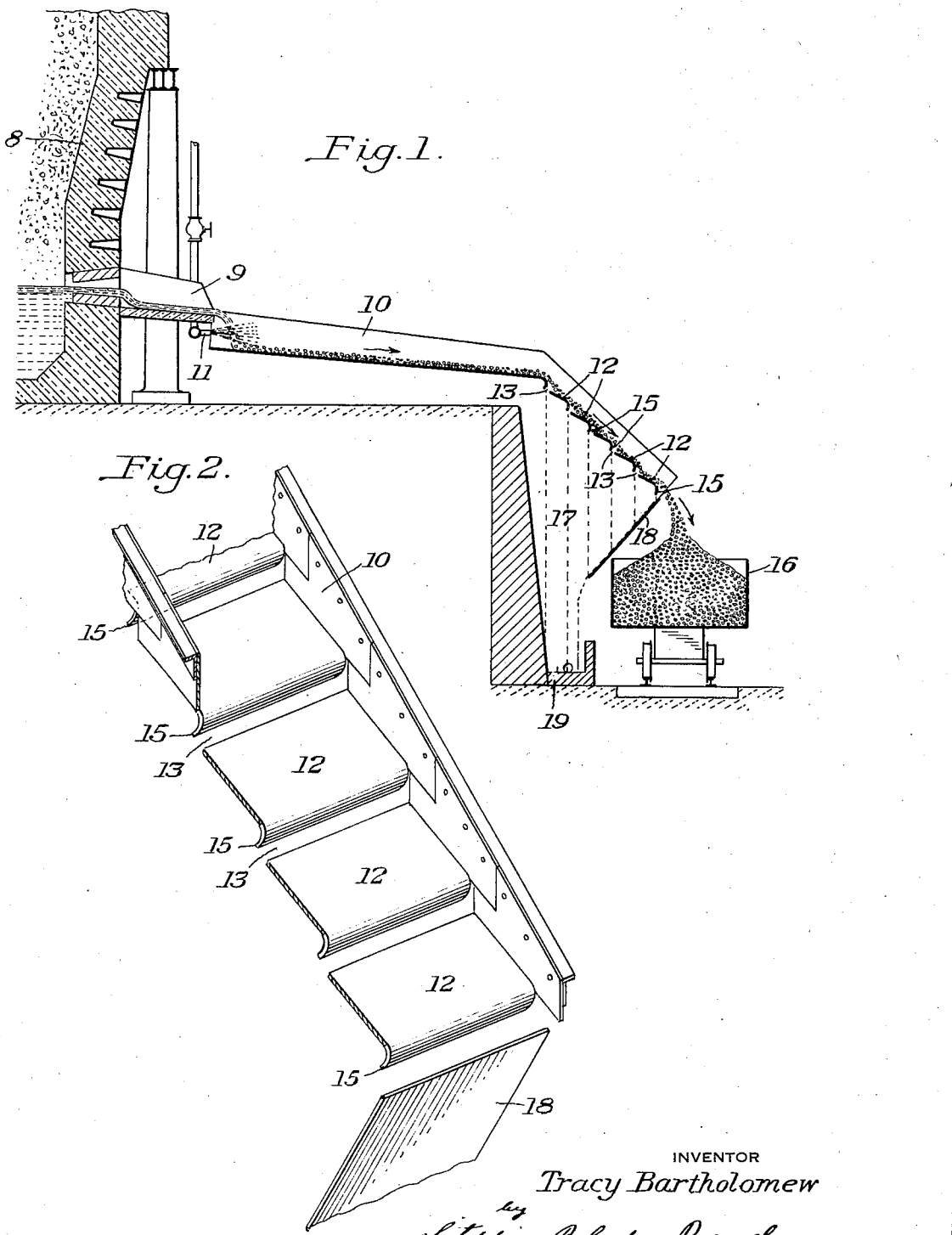

2,210,999

UNITED STATES PATENT OFFICE 2,210,999

PRODUCTION OF DRY GRANULATED SLAG

Tracy Bartholomew, Pittsburgh, Pa.

Application December 20, 1937, Serial No. 180,703

12 Claims. (Cl. 83—91)

This invention relates to the production of commercially dry granulated slag and, further, to refinements for the production of higher quality dry granulates having special properties which adapt them for particular uses.

One of the objects of this invention is to produce a commercially dry granulate which can be transported and handled with negligible expense for contained water, and which can be produced at no greater cost than ordinary wet granulate.

Another object is to produce a dry granulate which is substantially free from devitrified material and has high hydraulicity and pozzolanic reactivity.

Another object is to produce an extra dry granular slag; one so dry that, without any expenditure for further removal of moisture, it may be ground to an extremely fine powder without becoming wet or even damp.

Another object is to produce a granular slag product which is clear to light grey in color and white in streak, which can be ground to give an unusually white or colorless powder without appreciable contamination of greys, browns or yellows.

In the accompanying drawings, which illustrate in a somewhat diagrammatic manner several embodiments of my invention;

Figure 1 is a vertical sectional view of one form of apparatus;

Figure 2 is an isometric view on an enlarged scale, illustrating the spaced dewatering plates which are utilized in separating the excess quenching liquid from the slag granulate;

Figure 3 is a view similar to Figure 1, but illustrating a modification in which a disperser wheel is employed for dispersing the molten slag into molten slag fragments, and in which the granulate is given an aeration treatment after it has been dewatered by passing over dewatering plates; and Figure 4 is a vertical sectional view, to an enlarged scale, of the disperser wheel and associated parts.

In a common method of producing granulated slag, a stream of molten slag is rather incompletely broken up by a stream of water to produce granulated slag and then the slag granulate and water are fed to a pit, where the slag completes its solidification, cools below the boiling point of the water and becomes thoroughly saturated with it.

Slag granulate made in this manner is of little commercial value, because it contains some 40 to 50% of water, when removed from the pit. Even after long drainage, such granulate still retains some 10% of water, much of which is held quite tenaciously within the fine pores, and can be removed by evaporation only with difficulty and at considerable expense. Furthermore, the product lacks uniformity. Whereas some parts of the fluid slag have been quenched sufficiently thoroughly to prevent devitrification, the coarser parts of the slag have been thoroughly quenched on their surfaces only, and their interiors have cooled more slowly and have devitrified. Such coarser parts usually shatter during cooling, so that the finished product consists of a mixture of vitreous and devitrified slag particles, all thoroughly saturated with water.

Many attempts have been made to produce a good dry granulate but none has been really successful. In general, they have only inadequately provided for dispersing or breaking up the slag stream, for quenching it with water, and for removing surplus quenching water. Attempts to produce a dry product by using so little water that all will be evaporated by the sensible heat of the slag have not proven successful, but have generally resulted in a product that was neither completely amorphous, nor sufficiently dry to avoid the necessity for a separate drying operation, nor sufficiently economical to warrant wide use. Where an excess of quenching water has been supplied, the means used for separating the granulate from the excess water have been inadequate so that the resulting product has invariably been wet or at least so moist that it could not be ground to a fine powder without becoming wet. The use of screens to separate slag granulate and water has not proven successful. Where the openings in the screen are made sufficiently small to prevent the slag particles from passing through, the screen chokes up and allows the water to discharge with the granulate. If the openings are made large enough to prevent choking, then a considerable proportion of the granulate goes through with the water, particularly if the particles are small enough to insure that their interiors are vitreous. No prior process has economically produced uniformly amorphous granulate which is dry enough to be ground without becoming damp.

The present invention comprises methods and means (1) to adequately disperse or break up the molten slag into molten slag fragments which will be so small that they may be completely chilled to their centers before devitrification commences, in order to insure uniform amorphous granulate without devitrified contamination, (2) to quickly separate excess quenching water from the surfaces of freshly granulated slag particles to give a substantially dry product, (3) to further remove any adsorbed or absorbed moisture to produce a substantially bone-dry product.

I separate the freshly quenched slag particles from excess quenching liquid more quickly, more effectively and more economically than any prior known process. Water wets and adheres to most surfaces, such as cold metal. It does not wet or adhere to slag in the molten condition, nor when it is first solidified and still incandescent, nor when the slag has a surface temperature greatly exceeding that of boiling water. Under such conditions, the water is held away from the slag by a film of steam and can not contact the slag, even though it may cover it completely. When a freshly quenched mixture comprising such hot slag and water comes into contact with a cool surface, the water wets the surface and tends to cling or adhere to it, whereas there is no tendency for the water to adhere to the hot slag, nor for the hot slag to adhere to the metal surface. I utilize this phenomenon in separating the slag granulate from the excess water by flowing the mixture of slag and excess water over or across a plurality of surfaces, which are spaced apart in the direction of the flow of the mixture. In this manner, the water which contacts the surface tends to adhere thereto, flows more slowly than does the hot slag, and, in passing over the curved lip at the discharge end, is drawn away and separated from the slag which moves in another direction as by inertia in the embodiments described. As I use a considerable excess of water and as each surface is effective in drawing away only a thin film of water, I employ a series of such surfaces and withdraw excess water from the slag at a plurality of points along the path of flow of the mixture. These surfaces, to which the quenching liquid has a tendency to adhere, are preferably metal surfaces, although other surfaces may be employed.

Referring more particularly to the accompanying drawings and for the present to Figures 1 and 2, molten slag from a ladle (not shown) or direct from a blast furnace 8 is supplied by a runner 9 to a trough or sluice 10. As the stream of molten slag flows from the runner into the trough, it is contacted by a water jet 11, which impinges forcibly against the stream of slag and breaks it up into fluid slag particles, which thereafter solidify into solid slag granulate. The amount of water supplied to the molten stream of slag is in excess of that which would be evaporated by the heat contained in the slag. The excess water insures rapid chilling of the slag granulate. The mixture of slag granulate and excess water flows down the sluice 10 on to a series of dewatering plates 12. These plates are spaced apart from each other in the direction of flow of the mixture, so as to provide spaces or gaps 13 between them, which spaces are at least several times the average diameter of the slag particles being treated. The discharge end of the trough 10, and the discharge end of each of the plates 12 is provided with a downwardly extending curved portion or lip 15. As the mixture of slag granulate and water flows from the end of the trough over the dewatering plates, the slag granulate, due to inertia, jumps over the gaps between the plates and is discharged in a pile in a car 16. The excess water, however, since it has a tendency to adhere to the plates 12, drops down by gravity through the gaps 13, being drawn in this direction by the downwardly curved lips 15. The water flowing down in the paths 17 is deflected by a plate 18 into a gutter 19.

The arrangement shown in Figures 1 and 2 may be employed for producing low cost commercially dry slag granulate, which is sufficiently dry for most purposes. The surfaces of the particles are entirely dry, but there is some small amount of absorbed moisture within the interior of the particles which would be objectionable, if the particles are to be ground to a very fine size; also the product may contain more or less devitrified slag, depending upon the efficiency of the jet 11 used, as no amount of surface water will prevent the devitrification of the interiors of large particles. For a higher grade product, I may employ the device shown in Figures 3 and 4, in which the fluid slag stream is efficiently dispersed or broken up and the granulate is subjected to an aeration treatment after passing over the dewatering plates.

Referring to Figures 3 and 4, the molten slag is fed from a blast furnace 22 through a runner 23 to a disperser wheel, indicated generally by the reference numeral 24. This disperser wheel is provided with impact surfaces or blades 25, which revolve about a horizontal axis 26. Water is supplied to the disperser wheel from a spray 27, which supplies the water to the wheel at a point slightly in advance of the point 28 where the stream of molten slag is supplied to the wheel. Rapid rotation of the disperser wheel breaks up the falling stream of molten slag and disperses it as fine particles along the paths 29. The dispersed slag and excess quenching water are thrown off from the disperser wheel along the paths 29 and impinge against guide plates 30, which direct the mixture of slag granulate and excess water along the trough 31. The surfaces of the guide plates 30 are kept wet and cool by the water thrown from the disperser wheel and are further cooled and wetted as may be necessary by additional water sprays 27a.

The mixture of slag granulate and excess water is discharged from the trough or sluice 31 on to a series of dewatering plates 32, arranged substantially as previously described in connection with Figures 1 and 2. The excess water follows the lips 33 formed at the exit ends of the trough and dewatering plates and drops by gravity on to a guide plate 34. The slag granulate jumps the gaps between the dewatering plates and is discharged from the lower dewatering plate in a pile 35 retained within the walls 36 and 37. The passage of the slag granulate over the dewatering plates removes substantially all of the surface water; but where it is desired to grind the particles into a very fine state, it is preferred to subject them to an aeration treatment, in order to remove residual and absorbed moisture. One such means is shown in Figure 3, in which there is provided a drag conveyor, indicated generally by the reference numeral 38, which is arranged not only to drag the hot granulated slag from the pile 35 but also to turn it over repeatedly as well, so as to expose all portions to the air before delivering it from a chute 39 into a car 40. The conveyor 38 comprises chains 41 passing over sprocket wheels 42 and is provided with plow shaped cross-flights 43, which turn over and aerate the granulated slag while conveying it.

There is a tendency for the very finest particles of slag to become throughly cooled in the sluice 31 and, therefore, to be wetted and to follow the water along the paths 44, when the separation of the excess water from the slag is made on the dewatering plates. The quantity of slag so separated with the water depends upon the proportion of extremely fine particles dispersed by the wheel 24 or other means used for this purpose. I prefer to use a disperser wheel rather than other means, because it thoroughly disperses the slag into particles which are small enough to be completely quenched, yet it does not produce any substantial proportion of extremely fine particles, such as 50 mesh or smaller, which particles would tend to be too greatly cooled in the sluice and hence follow the water along the paths 44 from the dewatering plates. The quantity of slag following these paths is quite small, usually not more than about 1% of the total slag; but the apparatus shown is arranged to reunite this small proportion of wet slag with the dry hot slag, so that no special attention or expense is involved for its drying, handling or disposition.

The small amount of wet fine slag granulate dropping down along the paths 44, along with the excess quenching water, is deflected by the guide 34 and the guide 45 into a sump 46. The excess water in the sump 46 overflows into a trough 41 and may be reused for quenching purposes, if desired. The slag granulate in the sump 46 sinks to the bottom and is picked up by the flights 43 of the conveyor and is mixed with the much larger proportion of hot slag granulate, which is picked up by the conveyor in its passage over the top of the pile 35. Thus the heat of the hot slag granulate is utilized for drying the small proportion of wet granulate which is picked up from the sump 46. As the granulate is elevated from the pile 35, it is repeatedly turned over by the flights 43, thereby aerating it and removing any moisture which may have been present after passing over the dewatering plates. This thoroughly dried and aerated granulate is then discharged through a chute 39 into the car 40.

I may make slag granulate in accordance with this invention, which in addition to being so dry that it can be ground to a fine powder without becoming wet or damp, is substantially free from devitrified particles, has maximum hydraulicity and pozzolanic activity and is especially suitable for use in blended cement.

Granulates are normally much discolored by yellow and browns which I have found are not inherent in the slag but are formed by oxidation of ferrous iron into ferric iron while the granulate is wet or moist. By reason of extremely quick chilling and drying, my product may be made not only uniformly amorphous and dry but also unusually free from ferric iron, light in color and uniform in character, and after grinding yields an exceptionally white or colorless powder without appreciable contamination by greys, browns or yellows. Consequently, it is suitable for use even in the most expensive white cements.

The term "slag" as used herein is intended to include not only blast furnace slag but all other silicate melts which behave similarly when treated by the method and apparatus herein disclosed.

Although I have illustrated and described several embodiments of my invention, it is to be understood that the invention is not limited therein, but may be otherwise embodied or practiced within the scope of the following claims.

I claim:

1. The method of making substantially dry granulated slag of small particle size and adapted for use in cement, which comprises dispersing a stream of molten slag into fine particles by impact and immediately quenching said fine particles with an excess of liquid sufficient to maintain said particles in a vitreous condition throughout their mass, supplying the excess liquid and particles to a plurality of surfaces spaced and stepped in the direction of flow, passing the granulate over said surfaces and the spaces therebetween, and withdrawing the excess liquid from the surfaces through said spaces in a different direction from the slag granulate.

2. The method of making substantially dry granulated slag of small particle size and adapted for use in cement, which comprises dispersing a stream of molten slag into fine particles by impact and immediately quenching said fine particles with an excess of liquid sufficient to maintain said particles in a vitreous condition throughout their mass, supplying the excess liquid and particles to a plurality of surfaces spaced and stepped in the direction of flow, passing the granulate over said surfaces and the spaces therebetween, withdrawing the excess liquid from the surfaces through said spaces in a different direction from the slag granulate, and thereafter turning over said particles repeatedly in an atmosphere of low relative humidity while they are still hot to remove substantially all of the residual moisture.

3. The method of making substantially dry granulated slag of small particle size and adapted for use in cement, which comprises dispersing a stream of molten slag into fine particles by impact and immediately quenching said fine particles with an excess of liquid sufficient to maintain said particles in a vitreous condition throughout their mass, supplying the excess liquid and particles to a plurality of stepped surfaces spaced from each other at least several times the average diameter of the slag particles being treated, passing the granulate over said surfaces and the spaces therebetween and withdrawing the excess liquid from the surfaces through said spaces in a different direction from the slag granulate.

4. The method of making substantially dry granulated slag of small particle size and adapted for use in cement, which comprises dispersing a stream of molten slag into fine particles by impact and immediately quenching said fine particles with an excess of liquid sufficient to maintain said particles in a vitreous condition throughout their mass, supplying the excess liquid and particles to a plurality of surfaces which are inclined throughout substantially their whole extent and spaced and stepped in the direction of flow, passing the granulate over said surfaces and the spaces therebetween, and withdrawing the excess liquid from the surfaces through said spaces in a different direction from the slag granulate.

5. The method of making substantially dry granulated slag of small particle size and adapted for use in cement, which comprises dispersing a stream of molten slag into fine particles by impact of a disperser wheel and immediately quenching said fine particles with an excess of liquid sufficient to maintain said particles in a vitreous condition throughout their mass, supplying the excess liquid and particles to a plurality of surfaces, spaced and stepped in the direction of flow, passing the granulate over said surfaces and the spaces therebetween, and withdrawing the excess liquid from the surfaces through said spaces in a different direction from the slag granulate.

6. Apparatus for making substantially dry granulated slag of small particle size and adapted for use in cement, which comprises means for dispersing a stream of molten slag into fine particles, means for immediately quenching said fine particles with an excess of liquid sufficient to maintain said particles in a vitreous condition throughout their mass, a plurality of surfaces spaced and stepped in the direction of flow of the slag granulate, means for supplying the excess liquid and slag granulate to said surfaces, and means for withdrawing the excess liquid from the surfaces through said spaces in a different direction from the slag granulate.

7. Apparatus for making substantially dry granulated slag of small particle size and adapted for use in cement, which comprises means for dispersing a stream of molten slag into fine particles, means for immediately quenching said fine particles with an excess of liquid sufficient to maintain said particles in a vitreous condition throughout their mass, a plurality of surfaces spaced and stepped in the direction of flow of the slag granulate, means for supplying the excess liquid and slag granulate to said surfaces, means for withdrawing the excess liquid from the surfaces through said spaces in a different direction from the slag granulate, and means for turning over said particles repeatedly in an atmosphere of low relative humidity while they are still hot to remove substantially all of the residual moisture.

8. Apparatus for making substantially dry granulated slag of small particle size and adapted for use in cement, which comprises impact means for dispersing a stream of molten slag into fine particles, means for immediately quenching said fine particles with an excess of liquid sufficient to maintain said particles in a vitreous condition throughout their mass, a plurality of stepped surfaces spaced from each other at least several times the average diameter of the slag particles being treated, means for supplying the excess liquid and slag granulate to said surfaces, and means for withdrawing the excess liquid from the surfaces through said spaces in a different direction from the slag granulate.

9. Apparatus for making substantially dry granulated slag of small particle size and adapted for use in cement, which comprises means for dispersing a stream of molten slag into fine particles, means for immediately quenching said fine particles with an excess of liquid sufficient to maintain said particles in a vitreous condition throughout their mass, a plurality of surfaces which are inclined throughout substantially their whole extent and spaced and stepped in the direction of flow of the granulate, means for supplying the excess liquid and slag granulate to said surfaces, passing the granulate over said surfaces and the spaces therebetween, and means for withdrawing the excess liquid from the surfaces through said spaces in a different direction from the slag granulate.

10. Apparatus for making substantially dry granulated slag of small particle size and adapted for use in cement, which comprises an impact wheel for dispersing a stream of molten slag into fine particles, means for immediately quenching said fine particles with an excess of liquid sufficient to maintain said particles in a vitreous condition throughout their mass, a plurality of surfaces spaced and stepped in the direction of flow of the slag granulate, means for supplying the excess liquid and slag granulate to said surfaces, and means for withdrawing the excess liquid from the surfaces through said spaces in a different direction from the slag granulate.

11. Apparatus for making substantially dry granulated slag of small particle size and adapted for use in cement, which comprises an impact wheel for dispersing a stream of molten slag into fine particles, means for immediately quenching said fine particles with an excess of liquid sufficient to maintain said particles in a vitreous condition throughout their mass, a plurality of surfaces spaced and stepped in the direction of flow of the slag granulate, means for supplying the excess liquid and slag granulate to said surfaces, means for withdrawing the excess liquid from the surfaces through said spaces in a different diection from the slag granulate, and means for turning over said particles repeatedly in an atmosphere of low relative humidity while they are still hot to remove substantially all of the residual moisture.

12. Apparatus for making substantially dry granulated slag of small particle size and adapted for use in cement, which comprises means for dispersing a stream of molten slag into fine particles, means for immediately quenching said fine particles with an excess of liquid, a trough for receiving the slag particles and excess liquid, said trough being long enough to maintain said particles and liquid in contact with each other for a time sufficient to maintain said particles in a vitreous condition throughout their mass, a plurality of surfaces spaced and stepped in the direction of flow of the slag granulate, means for supplying the excess liquid and slag granulate to said surfaces, means for withdrawing the excess liquid from the surfaces through said spaces in a different direction from the slag granulate, and means for turning over said particles repeatedly in an atmosphere of low relative humidity while they are still hot to remove substantially all of the residual moisture.

TRACY BARTHOLOMEW.